United States Patent
Ikoma et al.

(10) Patent No.: US 6,990,294 B2
(45) Date of Patent: Jan. 24, 2006

(54) OPTICAL NETWORK SYSTEM WITH QUALITY CONTROL FUNCTION

(75) Inventors: Yoshiaki Ikoma, Palo Alto, CA (US); Masaki Miyagami, Yokohama (JP); Shinji Sakano, Kamakura (JP)

(73) Assignee: Hitachi, Ltd, Tokyo (JP)

( * ) Notice: Subject to any disclaimer, the term of this patent is extended or adjusted under 35 U.S.C. 154(b) by 600 days.

(21) Appl. No.: 09/894,017

(22) Filed: Jun. 28, 2001

(65) Prior Publication Data

US 2002/0097460 A1 Jul. 25, 2002

(30) Foreign Application Priority Data

Jan. 25, 2001 (JP) ........................ 2001-017498

(51) Int. Cl.
*H04B 10/08* (2006.01)
*H04B 10/14* (2006.01)
*H04S 14/02* (2006.01)

(52) U.S. Cl. .................... 398/16; 396/26; 396/27; 396/34

(58) Field of Classification Search .............. 398/9, 398/16, 25, 26, 27, 30, 33, 34
See application file for complete search history.

(56) References Cited

U.S. PATENT DOCUMENTS

| | | | | |
|---|---|---|---|---|
| 5,235,645 | A | * | 8/1993 | Stocker .................. 380/268 |
| 5,392,289 | A | * | 2/1995 | Varian .................... 714/707 |
| 6,480,308 | B1 | * | 11/2002 | Yoshida et al. .......... 398/16 |
| 2003/0147585 | A1 | * | 8/2003 | Kikuchi et al. .......... 385/24 |

* cited by examiner

*Primary Examiner*—Jason Chan
*Assistant Examiner*—Nathan Curs
(74) *Attorney, Agent, or Firm*—Knoble Yoshida & Dunleavy LLC

(57) ABSTRACT

To ensure transmission in a flexible optical network system, a digital test signal generation/comparison circuit is incorporated in an electrical signal processing portion of a transponder. The optical network system provides transparent wavelength-division multiplex service regardless of the signal type in client optical signals. Prior to connecting a client optical line to the optical system, a selective insertion unit and a selective extraction unit enable quality assessment of the client optical line.

24 Claims, 8 Drawing Sheets

OPTICAL NETWORK SYSTEM WITH QUALITY CONTROL FUNCTION

FIELD OF THE INVENTION

The present invention relates to an optical network system, and more specifically to an optical network system that has functions for converting a variety of signals with different data rates and formats to optical signals of various wavelengths for wavelength-division multiplex transmission, and for monitoring the quality of a digital signal in the optical signal to maintain high-quality optical transmission.

The explosive growth of the Internet has created a need for communication networks capable of providing data communication service for different forms of data. A single optical network configuration must now support transmission of a wide variety of client signals having different data rates, formats, and protocols. For example, in addition to SONET(synchronous optical network)/SDH (synchronous digital hierarchy) traffic, networks must now also support Fast Ethernet, GigaEthernet, ESCON (Enterprise System Connection), FICION (Fiber Connection), and Fibre Channel formats. In such optical network systems for digital communication, each light wavelength of the multiple wavelength signals of a wavelength-division multiplex optical carrier simultaneously carries different types of digital signals in a common optical fiber of an optical transmission path network. Moreover, urban optical networks are now required to provide 'service provisioning,' which enables the subscriber to frequently change the type of connected signals for each wavelength, and 'circuit provisioning,' which provides similar flexibility for connections.

In the past, SONET and SDH were used primarily for voice traffic. They used fixed-frame formats that included communications management overhead and were based on fixed data rates. Certain bits of the frame were allocated as transmission quality bits for monitoring transmission quality and alarms to manage the transmission path accordingly. Transmission quality could always be managed by processing these signals that were normally contained in the digital bit stream of the signal.

To transmit signals in different digital signal formats over shared optical networks requires 'transparent communication.' Each signal must be transmitted in its own format or as close as possible thereto to make communication process transparent to the user. Transparent optical networks support a variety of user (client) terminal types to provide a general-purpose low-cost network.

To perform transparent transmission, the processing was limited to '2R regeneration,' (Reshaping, Regeneration) in which the signal levels of the digital 1s and 0s of the client signal are detected for converting to a specific wavelength of the wavelength-division optical network, and the wave shape and signal levels are regenerated. In '3R regeneration,' (Reshaping, Retiming, Regeneration) the clock timing of the digital signal is also regenerated. In the 2R and 3R regenerations, however, the quality of the data content of signals are not monitored, and there are certain problems that cannot be controlled by the quality control schemes that monitor digital signal levels alone. This is because the bit error rate degradation as represented in digital signal levels is a function not only of optical signal strength, but also of factors such as optical signal-to-noise ratio (OSNR) and reflection. For all practical purposes, however, in optical network systems that provide flexible 'circuit provisioning' and 'service provisioning' using wavelength converters (transponders) that perform only basic 2R or 3R regeneration of digital waveforms, the only thing that can be easily monitored is optical signal strength. Therefore, degradation due to other factors was evaluated.

To perform the same level of quality control as in SONET or SDL, dedicated overhead and special hardware to accommodate fixed data rates had to be added. In addition, processes were required to perform mapping from each different type of client signal to a common format such as SONET or SDL and provide the desired quality control. Furthermore, special interfaces also had to be provided for each type of client. This was a problem because the above need for highly complex processing ran counter to the needs of the communications community which was looking for simpler, not more complex, processing.

In addition to the above economic problem providing the required hardware for rigorous evaluation of signal quality, the operating cost associated with services using the hardware was also a burden. The most important factors to managers in the communications business in building networks are low cost, broad compatibility, and signal quality assurance. When circuit provisioning as described above is implemented in an optical network, an easy-to-use quality monitoring capability becomes even more important. Even after a path is initially established, there were likely frequent changes in the status of the network due to frequent switching of signal paths. When a communications network has switches at a large number of locations, for example, circuit continuity tests were performed after switching to verify that the switching was performed correctly. When a fault occurs, the tests were used to determine a specific section in which the fault has occurred. However, for each optical transmission path, the operation of the service was extremely labor-intensive as technicians were dispatched to various facilities in the system where test and measurement equipment had to be manually connected to perform primary signal testing. In other words, when it came to providing quality control in a network that supported flexible circuit provisioning, the operating costs were a major problem to be improved.

It is an object of the present invention to provide economical but rigorous signal quality control in a wavelength-division multiplex optical network system that operates independently of the type of transmission signals, an optical network system, and a transponder (wavelength-division multiplex system) with the substantially reduced need for human participation in service operations.

SUMMARY OF THE INVENTION

To accomplish the above object and other objects, according to the first aspect of the current invention, an optical network system with quality control function in the optical network system wherein a signal to be transmitted is converted to an optical signal of a prescribed wavelength and transmitted over an optical transmission path by a transmit-end wavelength converter, and the optical signal from the optical transmission path is received and wavelength-converted by a receive-end wavelength converter, for regenerating the signal to be transmitted, the optical network system including, the transmit-end wavelength converter for a transmit end with a first transponder further including, an optical signal input unit for inputting an optical signal to be transmitted, a test signal generator circuit ultimately connected to the optical signal input unit for generating a test signal for testing optical transmission quality, the test signal generator circuit further including, a clock generator for generating a clock signal indicative of a bit rate to be added to the test signal, an 'all 1s and all 0s' generator circuit for generating 'all 1s and all 0s' signals, and a scrambler circuit connected to the 'all 1s and all 0s' generator circuit for scrambling the 'all 1s and all 0s' signals to generate a scrambled test signal, an insertion circuit connected to the optical signal input unit and the test signal generator circuit for outputting an output signal by selectively inserting the test signal from the test signal generator circuit into the transmission path formed between the transmit end and a receive end, and a converter connected to the insertion circuit for converting the output signal of the insertion circuit to a predetermined optical wavelength, and the receive-end wavelength converter at the receive end with a second transponder further including, an extraction circuit for selectively extracting the test signal in the optical signal from the transmission path, a test comparison circuit connected to the extraction circuit for determining the optical transmission quality based on the test signal extracted by the extraction circuit, the test comparison circuit further including, a clock extraction circuit for extracting the clock signal from the test signal that is received at the receive end in order to synchronize with the bit rate of the selected test signal, a descrambler circuit connected to the clock extraction circuit for using the clock component for descrambling the scrambled test signal to generate descrambled signals, a selector circuit connected to the descrambler unit for selecting one of the descrambled signals from the descrambler circuit; and a comparison test circuit connected to the selector circuit for performing a test signal comparison and a bit error count/computation of the selected descrambled signal.

According to the second aspect of the current invention, an optical transponder in connection with a client line and an optical transmission line, including a first optical to electronic (O/E) converter for converting an optical signal from the client line to an electronic signal, a signal testing unit connected to the first O/E converter for selectively adding a scrambled test signal to the electronic signal so as to generate a test-signal-contained electronic signal, the signal testing unit further including, a clock generator for generating a clock signal indicative of a bit rate of a scrambled test signal to be added to the electronic signal, an 'all 1s and all 0s' generator circuit for generating 'all 1s and all 0s' signals, and a scrambler circuit connected to the 'all 1s and all 0s' generator circuit for scrambling the 'all 1s and all 0s' signals to generate the scrambled test signal, a first electronic optical (E/O) converter connected to the signal testing unit for converting the test-signal-contained electronic signal to generate a test-signal-contained optical signal to be transmitted in the optical transmission line, a second optical to electronic (O/E) converter connected to the signal testing unit for converting a received test-signal-contained optical signal from the optical transmission line to a second test-signal-contained electronic signal, wherein the signal testing unit determines the quality of transmission in the optical transmission line based upon the second test-signal-contained electronic signal, the signal testing unit further including, a clock extraction circuit for extracting the clock signal from the second test-signal-contained electronic signal in order to synchronize with the bit rate of the electronic test signal, a descrambler circuit connected to the clock extraction circuit for using a clock signal component for descrambling a scrambled test signal component of the second test-signal contained electronic signal to generate descrambled signals, a selector circuit connected to the descrambler unit for selecting one of the descrambled signals for the descrambler circuit, a comparison test circuit connected to the selector circuit for performing a test signal comparison and a bit error count/computation of the selected descrambled signal, and a second electronic to optical (E/O) converter connected to the signal testing unit for converting the second test-signal-contained electronic signal to generate a received optical signal for the client line.

According to the third aspect of the current invention, an optical signal network in connection with client lines and an optical network transmission line, a plurality of nodes each connected to a corresponding one of the client lines and the optical network transmission line, the client lines each having an optical signal at a predetermined optical wavelength, the optical network transmission line having an optical signal including multiplexed wavelengths, each of the nodes including, an optical wavelength separator connected to the optical network transmission line for separating a desired wavelength from the optical signal including multiplexed wavelengths, an optical wavelength combiner connected to the client lines and the optical network transmission line for creating the optical signal including multiplexed wavelengths, and a transponder connected to the optical wavelength separator and the optical wavelength combiner for converting an optical signal at a first wavelength to a second wavelength, the transponder further including a set of optical-to-electronic converters, electronic-to-optical converters and a transmission quality testing unit connected between an optical-to-electronic converter and an electronic-to-optical converter for testing a transmission quality of the optical network transmission line, the transmission quality testing unit further including, a test signal generator circuit for generating a test signal for testing optical network transmission line quality, the test signal generator circuit further including, a clock generator connected to the test signal generator circuit for generating a clock signal indicative of a bit rate of the test signal from the test signal generator circuit, and 'all 1s and all 0s' generator circuit for generating 'all 1s and 0s' signals, a scrambler circuit connected to the 'all 1s and all 0s' generator circuit for scrambling the 'all 1s and all 0s' signals to generate a scrambled test signal, a test comparison circuit for determining the optical network transmission line quality based on a test signal received from other nodes, the test comparison circuit further including, a clock extraction circuit for extracting a clock signal from a separated wavelength signal in order to determine the bit rate of the separated test signal, a descrambler circuit connected to the clock extraction circuit for using the clock signal for descrambling a received scrambled test signal to generate descrambled signals, a selector circuit connected to the descrambler unit for selecting one of the descrambled signals from the descrambler circuit, and a comparison test circuit connected to the selector circuit for performing a test signal comparison and a bit error count/computation of a selected descrambled signal.

According to the fourth aspect of the current invention, method of testing transmission quality in an optical network having optical transmission lines and client lines connected to the optical transmission lines, including, converting an optical signal at a first wavelength from one of the client lines to an electrical signal in a transponder, generating a test signal for testing optical transmission line quality, specifying a bit rate of the test signal by adding a clock signal to a test signal, adding the electrical signal and the test signal in the transponder to create a sum signal, scrambling the sum signal to generate a scrambled test signal, converting the scrambled test signal to an optical signal at a second wavelength in the transponder to be transmitted in the optical transmission lines, converting an optical signal at the second wavelength from the optical transmission lines to a second electrical signal in the transponder, extracting a clock signal from the second electrical signal, descrambling the second electrical signal based upon the extracted clock signal to generate descrambled signals, selecting one of the descrambled signals, performing a test signal comparison and a bit error count/computation with the selected descrambled signal, synchronizing the bit rate of the test signal with the clock signal, determining transmission quality based upon the test signal comparison in the transponder, and converting the second electrical signal to an optical signal at the first wavelength in the transponder to be outputted to the one of the client lines.

DETAILED DESCRIPTION OF PREFERRED EMBODIMENTS

In a preferred mode of the present invention, each node in the network has an optical switch for switching arbitrarily configured paths so that any desired optical path is quickly established by remote control. This operational flexibility in conjunction with the above digital signal test function not only guarantees high transmission quality, but also the capability to quickly test the signal quality.

Also, according to the present invention, an interface provides for remote switching capability for switching selective extraction and insertion units of the test function. When an optical path is set up by the operations system of the optical network system, before clients are connected to the path, the selective insertion unit of the transmit-end transponder in that optical path is connected to the digital test signal generator circuit. The selective extraction unit of the receive-end transponder of the optical path is connected to the digital test signal comparator circuit, and a digital signal test is performed on that path. Notification as to the error count results from the test would then be sent from the node at the receive end to the control function of the operations system. If the quality of the path were found to be good, the selective insertion unit at the transmit end and the selective extraction unit at the receive end would be connected to the optical-to-electrical (O/E) and electrical-to-optical (E/O) converters of the respective client nodes for transmitting signals therebetween. If the quality of the path were found to be inadequate, however, a new path would be set by the operations system. A similar quality test is performed for that path until a good optical path has been established. By selecting only optical paths that are known to be good in this manner, a high-quality transparent optical communication system is realized.

Figure 1:
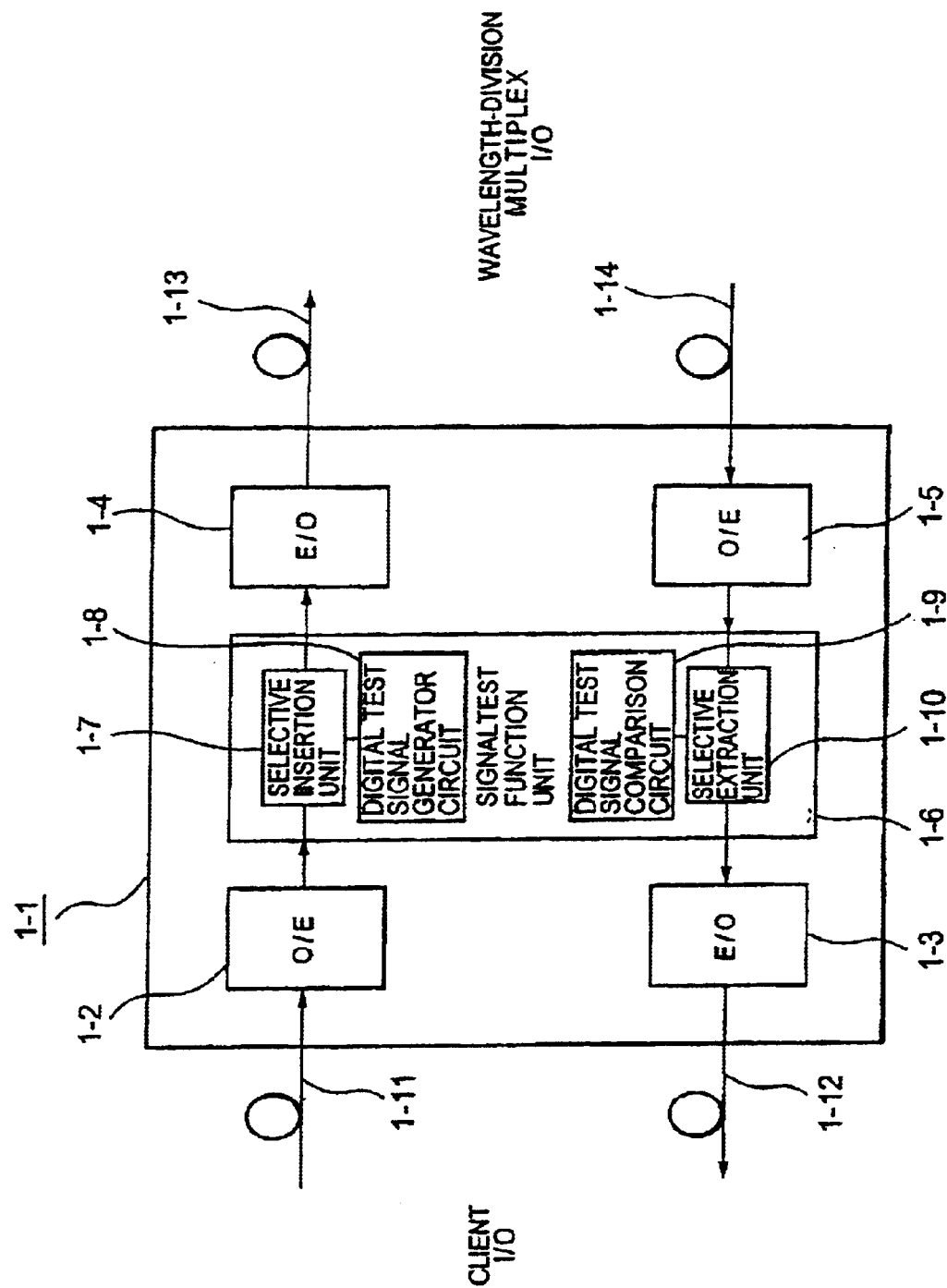
FIG. 1 is a block diagram illustrating one preferred embodiment of a transponder for use in an optical network system of the present invention.

FIG. 1 is a block diagram illustrating one preferred embodiment of a transponder for use in an optical network system according to the present invention. The transponder 1-1 in FIG. 1 includes a signal test function. The transponder 1-1 includes an O/E (optical/electrical) converter 1-2 for inputting from an optical fiber 1-11 an optical signal to be transmitted (i.e. an optical signal output from a client connected to the client I/O end of the transponder), and converting it to an electrical signal; an O/E converter 1-5 for inputting from an optical fiber 1-14 a signal of a prescribed wavelength from another optical signal source in the wavelength-division multiplex optical network, and converting it to an electrical signal; and a signal test function unit 1-6 for adding a digital test signal to the output of the O/E converter 1-2 and extracting a digital test signal from the output of the O/E converter 1-5. The preferred embodiment further includes an E/O converter 1-4 for converting the output of the signal test function unit 1-6 (the aforementioned client data signal or the digital test signal) to an optical signal at a desired optical output level, and having a predetermined wavelength of the wavelength-division multiplex optical network system, and outputting it to the optical fiber 1-13; and an E/O converter 1-3 for converting a digital signal from the test function unit 1-6 (a digital signal that had been included in an optical signal from another optical signal source) to an optical signal having the predetermined wavelength of the client.

The above O/E and E/O converters 1-2, 1-3, 14 and 1-5 are either fixed at a predetermined wavelength in the preferred embodiment. In an alternative embodiment, these O/E and E/O converters are variable with respect to a wavelength.

The signal test function unit 1-6 includes a selective inserter 1-7 for switching to add a test signal from a digital test signal generator 1-8 to a wavelength-division multiplex signal; a selective extractor 1-10 for selecting a digital test signal from an optical signal input from the wavelength-division multiplex I/O side of the transponder 1-1; and a digital test signal comparison circuit 1-9 for testing a digital signal transmission quality of a digital test signal that is selected by the selective extractor 1-10.

Figure 2:
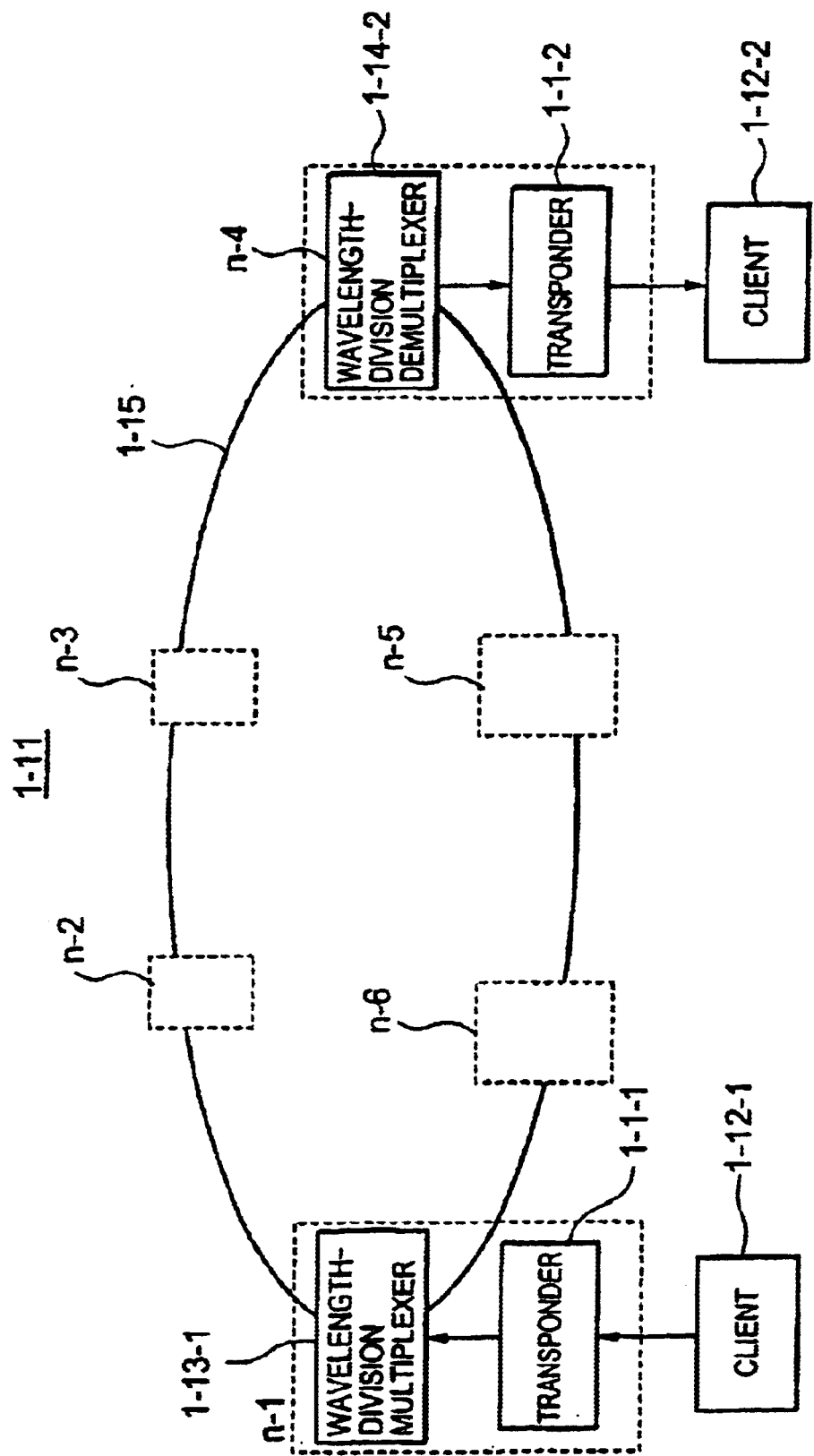
FIG. 2 is a block diagram illustrating a first preferred embodiment of the optical network system according to the present invention.

FIG. 2 is a block diagram illustrating a first preferred embodiment of an optical network system according to the present invention. The optical network 1-11 includes multiple nodes n1, n2, . . . n6 that are linked by an optical transmission line 1-15. Each node has a wavelength-division multiplexer 1-13-1 for multiplexing multiple wavelengths and a wavelength-division demultiplexer 1-14-2 for demultiplexing the multiplexed optical signal to obtain multiple optical signals of different wavelengths. To simplify the description, however, FIG. 2 shows only the transmit-end wavelength-division multiplexer 1-13-1 of node n–1, and the receive-end wavelength-division demultiplexer 1-14-2 of node n–4.

To perform a digital test on a single optical path going from node n–1 to node n–4, the system operates as follows: An optical signal from a transponder 1-1-1, which is set up to generate a digital test signal is multiplexed by the wavelength-division multiplexer 1-13-1 and is transmitted to the node n–4 by the optical network system 1-1. In the node n–4, the wavelength-division demultiplexer 1-14-2 demultiplexes the optical carrier signal to extract the desired optical signal which it inputs to the transponder 1-1-2. In the transponder 1-1-2, which is set up to perform a digital test signal comparison the digital test signal is examined to check transmission quality.

If the quality of the optical path as determined by the digital signal test is sufficiently good such as the bit error rate below 10–12 for connection to a client, the transmit and receive transponders 1-1-1 and 1-1-2 respectively are connected to the clients 1-12-1 and 1-12-2 to start sending/receiving data signals. For example, if the bit rate of the digital test signal is set higher than that of the client signal, and the test signal is transmitted with sufficient quality, this assures that the quality will be sufficient when the client's signal is transmitted over the optical network system.

Figure 3:
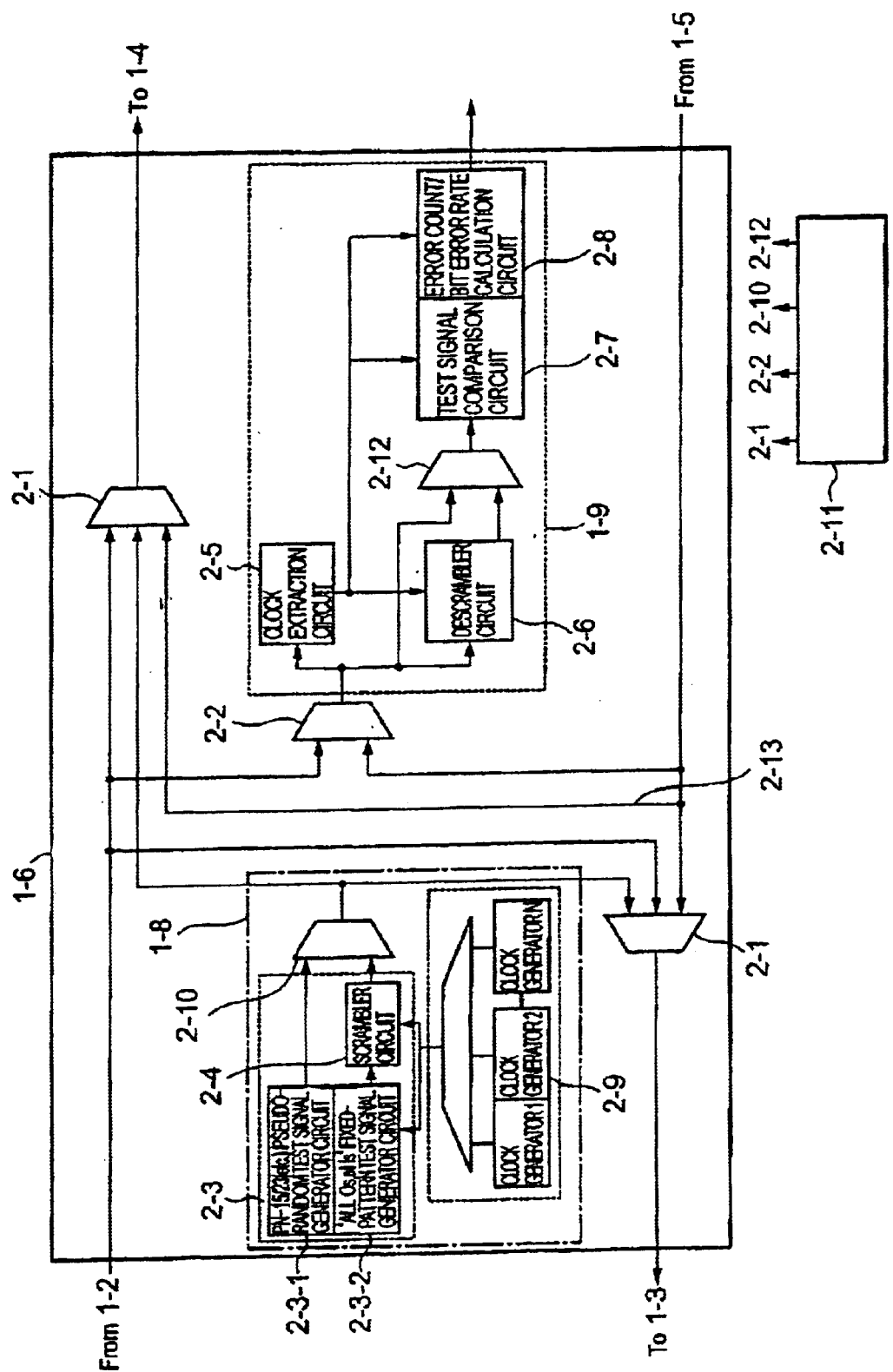
FIG. 3 is a block diagram illustrating the signal test function unit.

FIG. 3 is a block diagram illustrating one preferred embodiment of a signal test function unit 1-6. As shown in FIG. 3, a test signal generator circuit 1-8 includes a test signal generator 2-3, which further includes a first signal generator 2-3-1 for generating pseudo-random test signals PN-15, PN-23, etc.; a second signal generator 2-3-2 for generating fixed pattern 'all 1s. all 0s' test signals; and a scrambler 2-4 for adding a clock component to the 'all 1s, all 0s' test signals; an insertion test signal selector 2-10 for selecting a test signal to be inserted; and a clock generator 2-9 having one or more clock sources for providing clocks corresponding to the desired bit rate for insertion test signals to be used for testing.

The digital test signal comparison circuit 1-9 of FIG. 3 includes a clock extraction circuit 2-5 for extracting a clock component from test signals to be compared; a descrambler circuit 2-6 for restoring received scrambled test signals to their original states; a comparison test signal selector 2-12 for selecting a signal received either directly from the selector 2-2 or from the descrambler circuit 2-6; a test signal comparison circuit 2-7; and an error count/bit error calculator circuit 2-8. The test signal descrambler circuit 2-6, the comparison test signal selector 2-12, the test signal comparison circuit 2-7, and the error count/bit error calculator 2-8 are clocked by clock signals extracted by the clock extraction circuit 2-5. Also included in the signal test function unit 1-6 is a selector 2-1, which selects one of three signals for insertion in the optical wavelength-division multiplex carrier of the optical network system. The three signals include the regular primary signal (the data-bearing signal to be transmitted), a loop-back signal, and the test signal, from the O/E converter 1-2, the O/E converter 1-5, and the selector 2-10, respectively.

Because the signal test function unit 1-6 has a separate clock source (clock generator 2-9) on its test signal insertion side and a clock extraction circuit 2-5 on its comparison side for synchronization with the test signal data transmission rate, signal testing is entirely performed independently of the regular primary signal. Therefore, through the use of this signal test function unit 1-6 in a 2R transponder that does not depend on the client signal data rate, signal quality is assessed in a system in which operation does not depend on the type of a client signal and the transmission equipment. To perform a loop test, the selector 2-1 is remotely operated to select its input from a signal loop-back path 2-13 that connects to the signal on the receive end. The selectors 2-1, 2-1, 2-10 and 2-12 are operated by control signals from an external control circuit 2-11.

The only thing added to the conventional transponder configuration according to the present invention is the signal test function unit 1-6. A transponder and optical communication system according to the present invention is therefore configured at a minimum cost by simply inserting the signal test function unit 1-6 in the electrical signal portion of the original transponder without adding any new O/E or E/O converters. This makes it possible to provide a service-provisioning system with the flexibility to accommodate any kind of client signal and with a low-cost capability for evaluating the transmission system signal quality.

Operation of services using the system is also economically realized. Efficient and flexible service is provided through an optical network system capable of supporting any type of client signal, and connections for optical path destinations are frequently changed.

Figure 4:
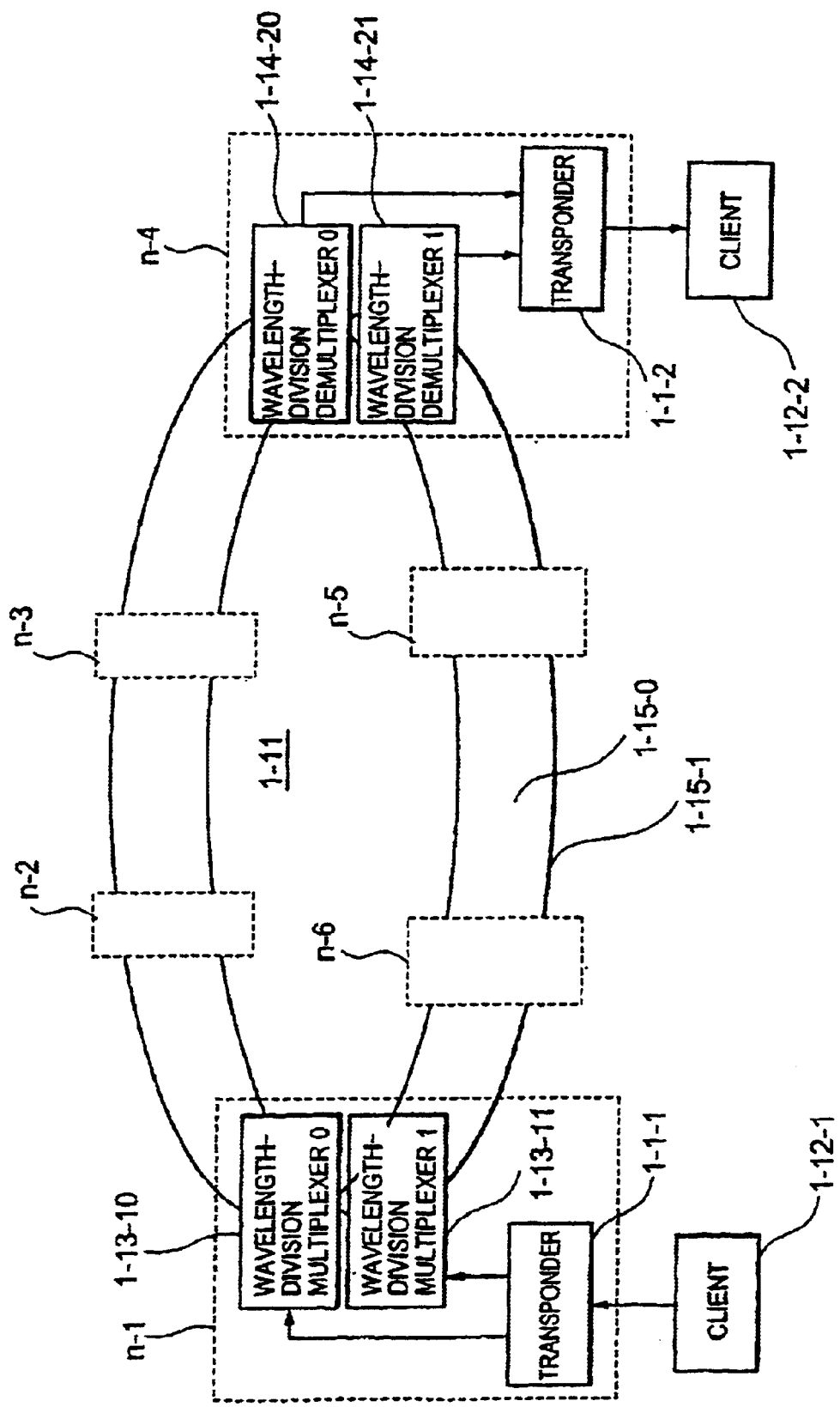
FIG. 4 shows a second preferred embodiment of the optical network system according to the present invention.

A second preferred embodiment of an optical network system according to the present invention is shown in FIG. 4. The invention is implemented in an OADM (optical add/drop multiplex) 2-fiber-ring system as an example of a transparent optical network system. The optical network system 1-11 has redundant circuits including a '0-circuit' and a '1-circuit' that are respectively made up of optical fiber transmission paths 1-15-0 and 1-15-1. Each node in the network (n–1, n–2, . . . n–6) has, for each of the two optical transmission paths, a wavelength-division multiplexer e.g. in node n–1, the multiplexers 1-13-10 and 1-13-11, respectively, for the 0- and 1-circuit, and a wavelength-division demultiplexer e.g., in node n–4, the demultiplexers 1-14-20 and 1-14-21, respectively for the 0- and 1-circuits. To simplify the description, only the multiplexers in the node n–1 and the demultiplexers in the node n–4 are shown in FIG. 4. Each node, however, has both multiplexers and demultiplexers.

Operation of the system for performing a digital signal test will now be described. In the node n–1 that is the transmit-end node in this example, an optical signal from a client 1-12-1 connected to the optical network system 1-11 is wavelength-converted by the transponder 1-1-1 and is split into two optical signals to be injected via the wavelength-division multiplexers respectively into the optical fiber transmission paths 1-15-0 and 1-15-1. At the receive end node n–4, the two optical signals are extracted from their optical carriers by the wavelength-division demultiplexers 1-14-20 and 1-14-21 that are respectively connected to the optical fiber transmission paths 1-15-0 and 1-15-1 and input to a transponder 1-1-2. From there, the optical signal of the path selected by the transponder 1-1-2 is connected to the client 1-12-2. This optical transmission system will be described for the case in which each of the transmit and receive transponders 1-1-1 and 1-1-2 has a signal test function as shown in FIG. 5.

Figure 5:
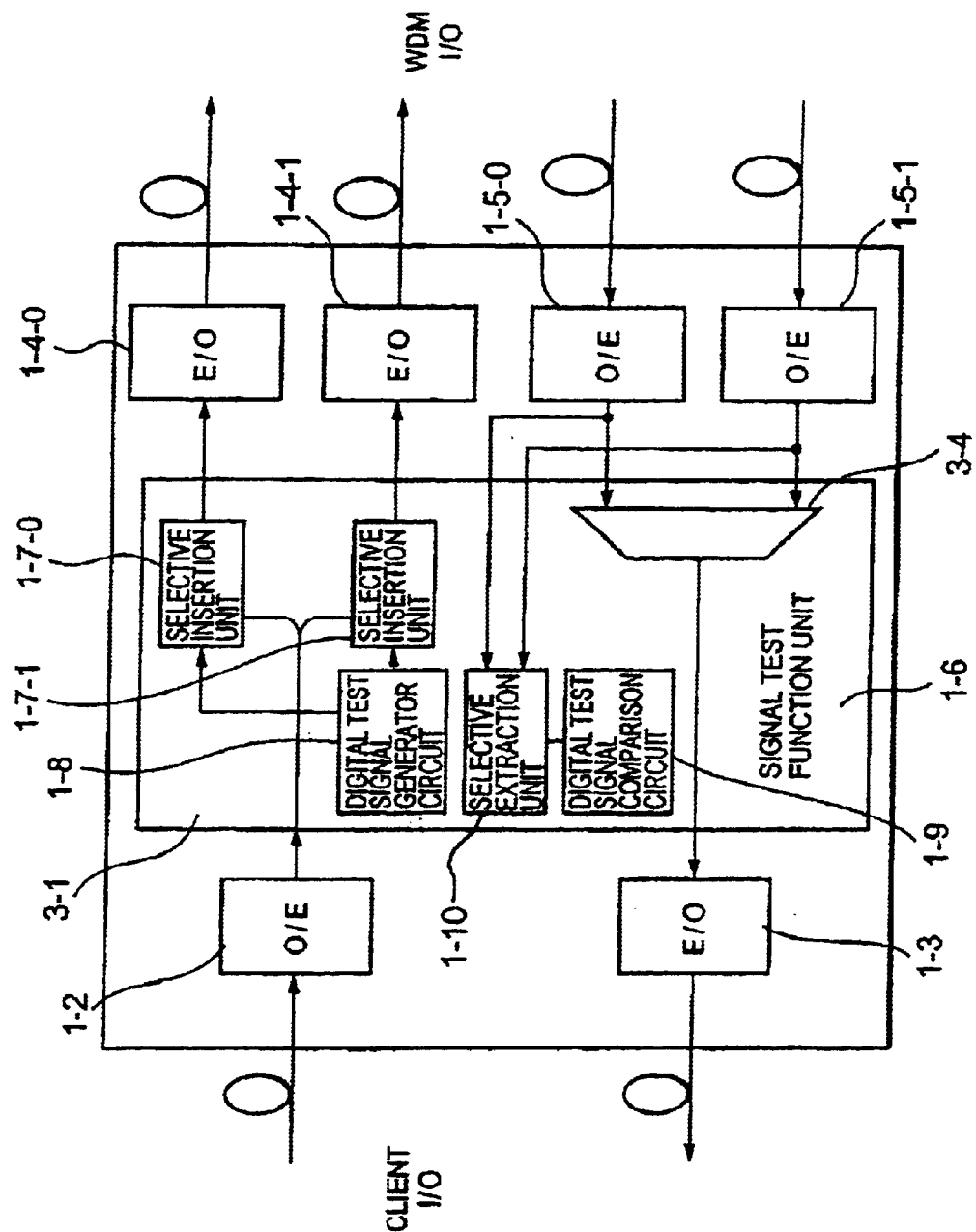
FIG. 5 shows the configuration of a transponder in a node of the network of the second preferred embodiment.

FIG. 5 shows the configuration of a transponder for one node of the exemplary network of FIG. 4. Although FIG. 4 shows the transponder divided into separate transmit and receive transponders 1-1-1 and 1-1-2, each node actually has both. In FIG. 5, elements that are substantially the same as the corresponding ones of FIG. 1 retain the same reference numbers and will not be further described in detail.

Normally, at the transmit-end node n–1 an electrical signal from an O/E converter 1-2 for detecting the digital optical signal is input to an E/O converter 1-4-0 which is connected to the 0-circuit optical fiber transmission path or the E/O converter 1-4-1, which is connected to the 1-circuit optical fiber transmission path, to be output as an optical signal of a specific wavelength. At the receive end, optical signals are received by an O/E converter 1-5-0 from the 0-circuit optical fiber transmission path and an O/E converter 1-5-1 from the 1-circuit optical fiber transmission path, which output them as converted electrical signals, one of which is selected by a selector 3-4 for input through an E/O converter 1-3 for output to the client as an optical signal at the client's prescribed wavelength.

When this optical path is set up, at the transmit end a signal from a digital test signal generator circuit 1-8 is switched for selection by the selective insertion unit 1-7-0 or 1-7-1 for transmission as a test signal over the 0- or 1-circuit transmission path. At the receive end, the test signal from 0- or 1-circuit is selected by the selective extraction unit 1-10 to be detected and tested in the digital test signal comparison circuit. When the test of one of the two transmission paths is finished, the connection is switched by the selective extraction unit 1-10, and the signal propagated through the other transmission path is conducted. In this manner, the quality of the transmitted signals of the 0- and 1-circuit transmission paths is tested. If the signal of one of the transmission paths does not meet the prescribed quality standard, the other path is selected. If both satisfy the prescribed quality standard, one of the paths is selected by setting the selective insertion units 1-7-0 and 1-7-1 at the transmit node and the selector 3-4 at the receive node as required to properly connect one of the acceptable-quality circuits.

In this redundant system, for the backup circuit that is not selected as the operating circuit, the test signal from the digital test signal generator circuit 1-8 at the transmit end is input via the selective insertion unit 1-7-0 or 1-7-1 to the backup E/O converter 1-4-0 or 1-4-1. At the receive end, the signal of the circuit in which the test signal is being transmitted is selected by the selective extraction unit 1-10 as an input to the digital test signal comparison circuit 1-9. In this manner, the transmission quality of the backup circuit is constantly monitored so that it will always be available for an immediate switch-over to the operating circuit.

If a fault degrades transmission quality in the operating circuit, the operating circuit traffic is switched over to the backup circuit, and the digital test signal is used to pinpoint the location of the fault. To do so, the required settings are performed as described above to perform digital signal comparisons for each span until the fault location is localized, based on the digital signal levels.

Figure 6:
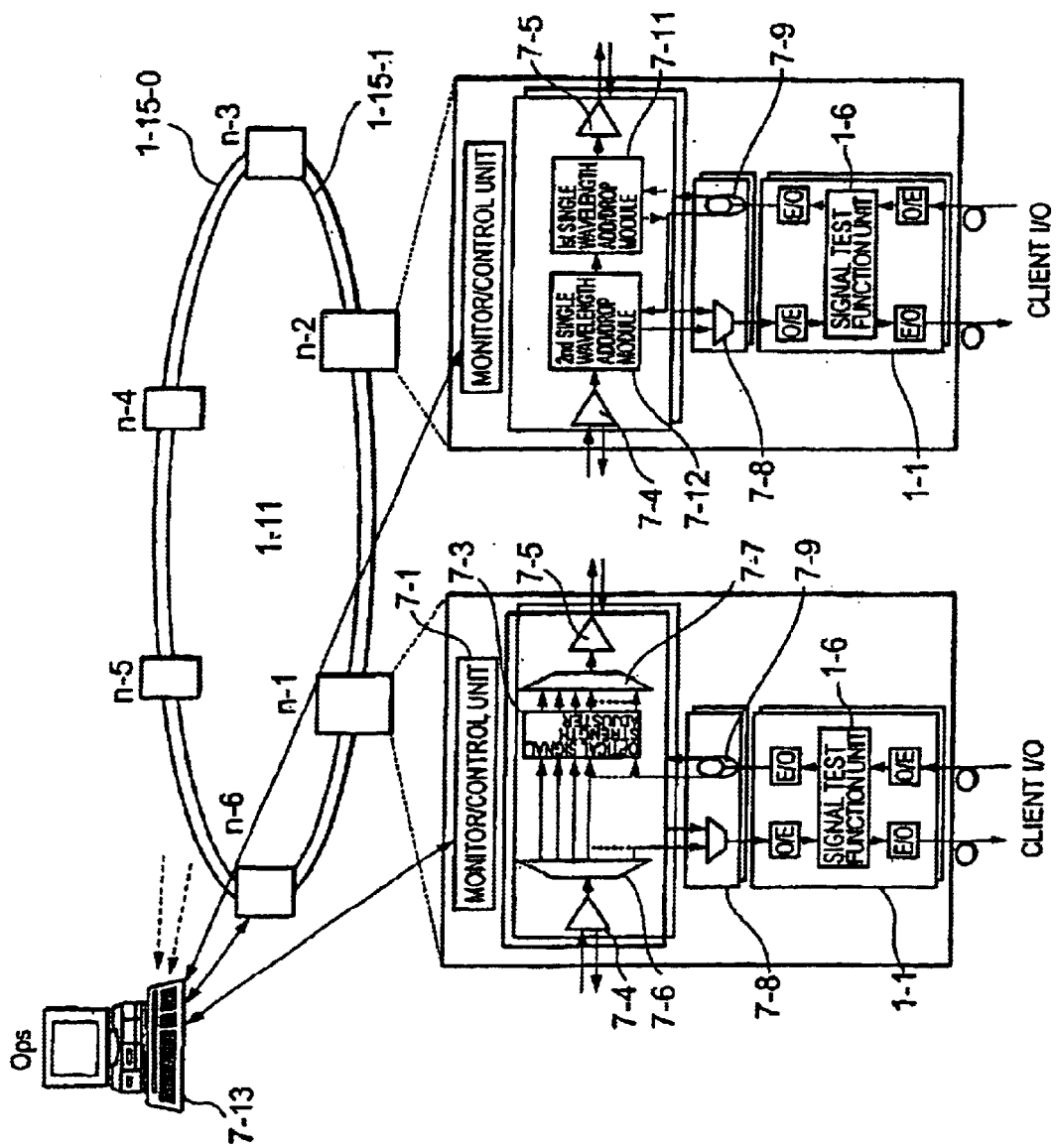
FIG. 6 shows a third preferred embodiment of the optical network system according to the present invention.

FIG. 6 shows a third preferred embodiment of the optical network system according to the present invention. The preferred embodiment is again implemented in an OADM 2-fiber ring system as an example of a transparent optical system. The system includes transponders 1-1 which are the same transponders as the transponders 1-1 of FIG. 1 for converting a signal from a client to an optical signal for the wavelength-division multiplex optical network system, and for performing the signal test quality processing after optical-to-electrical conversion of wavelength-division multiplex signals.

In a node n–1 at the transmit end, optical signals are split by an optical coupler 7-9 into two optical fiber transmission paths for the redundant 0- and 1-circuits of the optical network system. At the receive end, the 0- or 1-circuit optical signal is selected by an optical selector 7-8 that is controlled by an operations system. The transmit signal for each of the paths is adjusted to a prescribed optical output level by an optical signal strength adjuster 7-3 and multiplexed with signals of other wavelengths into a single optical fiber by a wavelength-division multiplex wave combiner 7-7. The resulting multiplexed signal is then amplified to the required optical output level by an optical post-amplifier 7-5. One of the two multiplexed optical signals is propagated in a transmission path 1-15-0 (the counterclockwise optical ring transmission path) and the other multiplexed optical signal is propagated in the other transmission path, 1-15-1. At a predetermined node n–2, the multiplexed optical signal is amplified by an optical pre-amplifier 7-4 provided at the input to the node.

In the single-wavelength add/drop module 7-12 for selecting and extracting light of only one specific wavelength, the optical signal of the selected light wavelength channel is 'dropped' or extracted from the multiplexed optical signal and injected into an optical selector 7-8. The optical signal from the other optical fiber is similarly injected into the optical selector 7-8 for the redundant configuration. The process of transmitting a signal in the opposite direction from the node n–2 to the node n–1 is essentially the same. It differs only in that the single-wavelength add/drop module 7-12 at the node n–2 adds the specific wavelength for the selected channel to the multiplex signal, and at the n–1 node, the demultiplexer 7-6 extracts the desired wavelength from the all-wavelength multiplexed optical signal.

The same transponder 1-1 as in FIG. 1 may be used for the transponder 1-1 in the third preferred embodiment. The optical selectors 7-8 for establishing optical paths and the selective insertion units 1-7 and the selective extraction units 1-10 for performing digital signal tests are remotely set through a monitor/control unit 7-1 in each node by an optical network system operations system 7-13. When an optical path is initially established, circuits are switched by optical selectors 7-8, and the transmit-end selective insertion unit 1-7 and receive-end selective extraction unit 1-10 are operated as required to test the signal transmission quality in each circuit (the 0-circuit and the 1-circuit). If the signal in one of the optical transmission paths fails to satisfy the predetermined quality standard, the other path is selected. If both satisfy the prescribed quality standard, either path is selected by setting the selective insertion unit 1-7 of the transmit node and the optical selector 7-8 of the receive node to select the operating circuit. High-quality transparent signal transmission between clients is provided by simply connecting the selective insertion unit 1-7 and the selective extraction unit 1-10 to their client interfaces.

Figure 7:
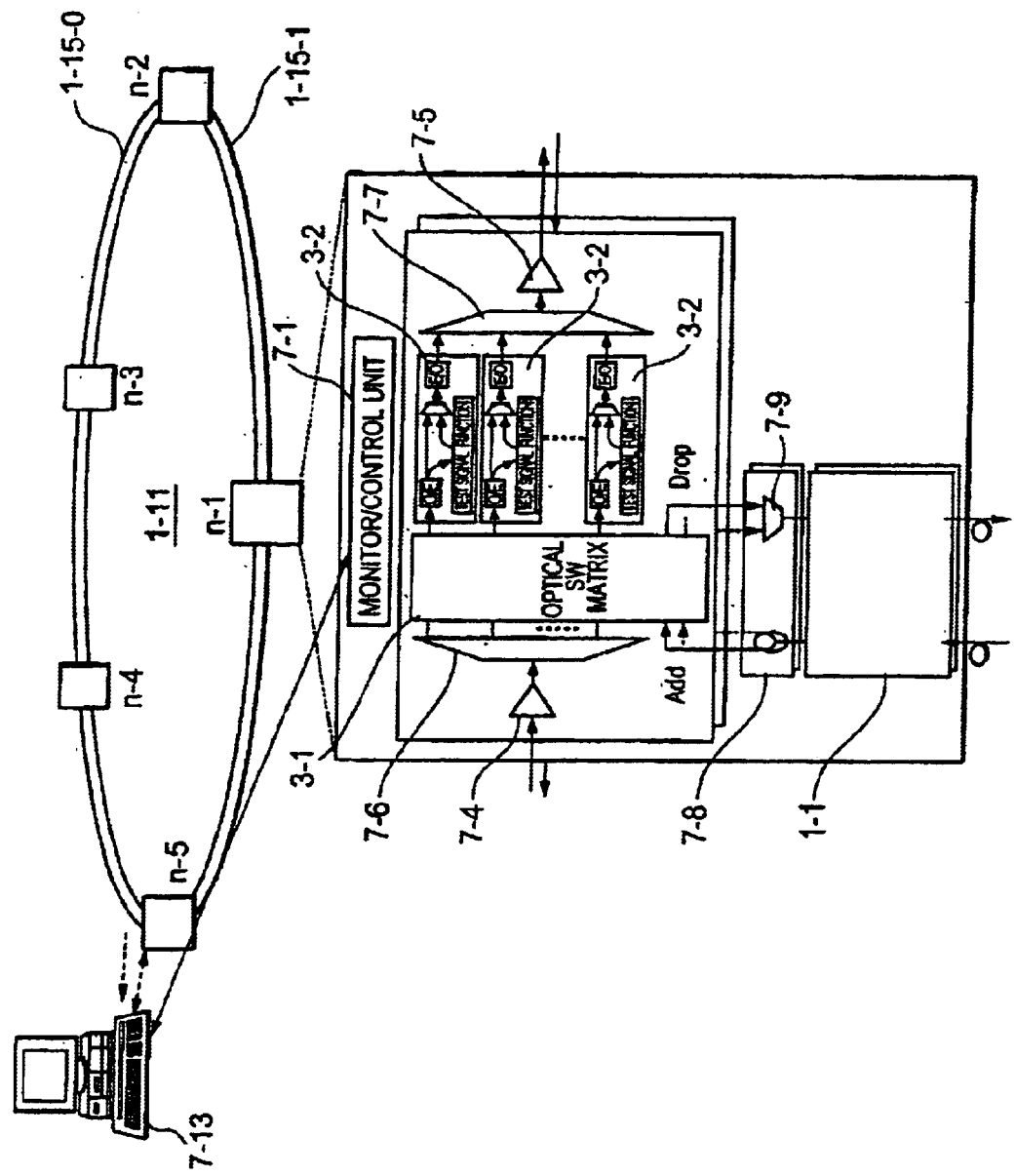
FIG. 7 shows a fourth preferred embodiment of the optical network system according to the present invention.

FIG. 7 shows a fourth preferred embodiment of the optical network system according to the present invention. In this preferred embodiment, a digital signal test function is incorporated in an optical network system in which optical switch matrices are used to perform dynamic optical path switching. This preferred embodiment has the same OADM 2-fiber ring 1-11 as shown in FIG. 6, in which the nodes n1, n2 . . . n5, each of which has a wavelength cross-connect function are connected between spans of two fiber ring circuits 1-15-0 and 1-15-1. The node n–1 switch has an optical switch matrix 3-1. The optical switch matrix 3-1 selects the signal of the desired wavelength from the signals input to the node n–1 from the ring 1-15 and any signals that are being added. The optical switch matrix 3-1 either drops the selected signal to the optical signal selection optical switch 7-9 or passes it through to a wavelength converter (transponder)/signal test function unit 3-2. Signals passed through the switch matrix to the wavelength converter (transponder)/signal test function unit 3-2 are wavelength converted and output to a wave combiner 7-7, where the different-wavelength signals are combined. The resulting signal is output to a transmit-end optical amplifier 7-5, which provides additional optical power amplification before the signal is transmitted from the node.

In the present preferred embodiment, the system is configured to provide flexible switching of the primary signal paths and is responsive to the current demand for communication service. In such a system, however, when there is a large number of primary signal switching locations, it is important to be able to verify connectability which requires wavelength conversion (i.e., a transponder) before the signal reaches the wave combiner 7-7.

Since the configuration in this preferred embodiment already has a functional unit that processes signals in an electrical form wavelength converter (transponder)/signal test function unit 3-2, a signal test function is inserted for verifying a normal status of cross-connects made by the optical switch matrix 3-1. If each node in the network is configured in this manner, the system will also have the capability to narrow the location of a fault or a cause for degradation to the fiber span between two specific nodes.

It is also conceivable that a test function as described above might not be required for all wavelength-division multiplex channels or wavelengths at the same time. Therefore, an alternative configuration could be realized wherein there is a common test function in one node, and the optical switch matrix 3-1 has the capability to selectively connect optical signals for individual wavelengths to the signal test function unit.

The setting of optical transmission paths by automatic switching of the optical switch matrix 3-1 is performed by remote control from the operations system 7-13 of the optical network system through the monitor/control unit 7-1 of each node. In particular, by performing this control in conjunction with control of signal test function settings, when an optical path is initially set up, quality control is performed to manage the optical transmission quality of the path, and fault locations are pinpointed if an optical path becomes degraded.

Figure 8:
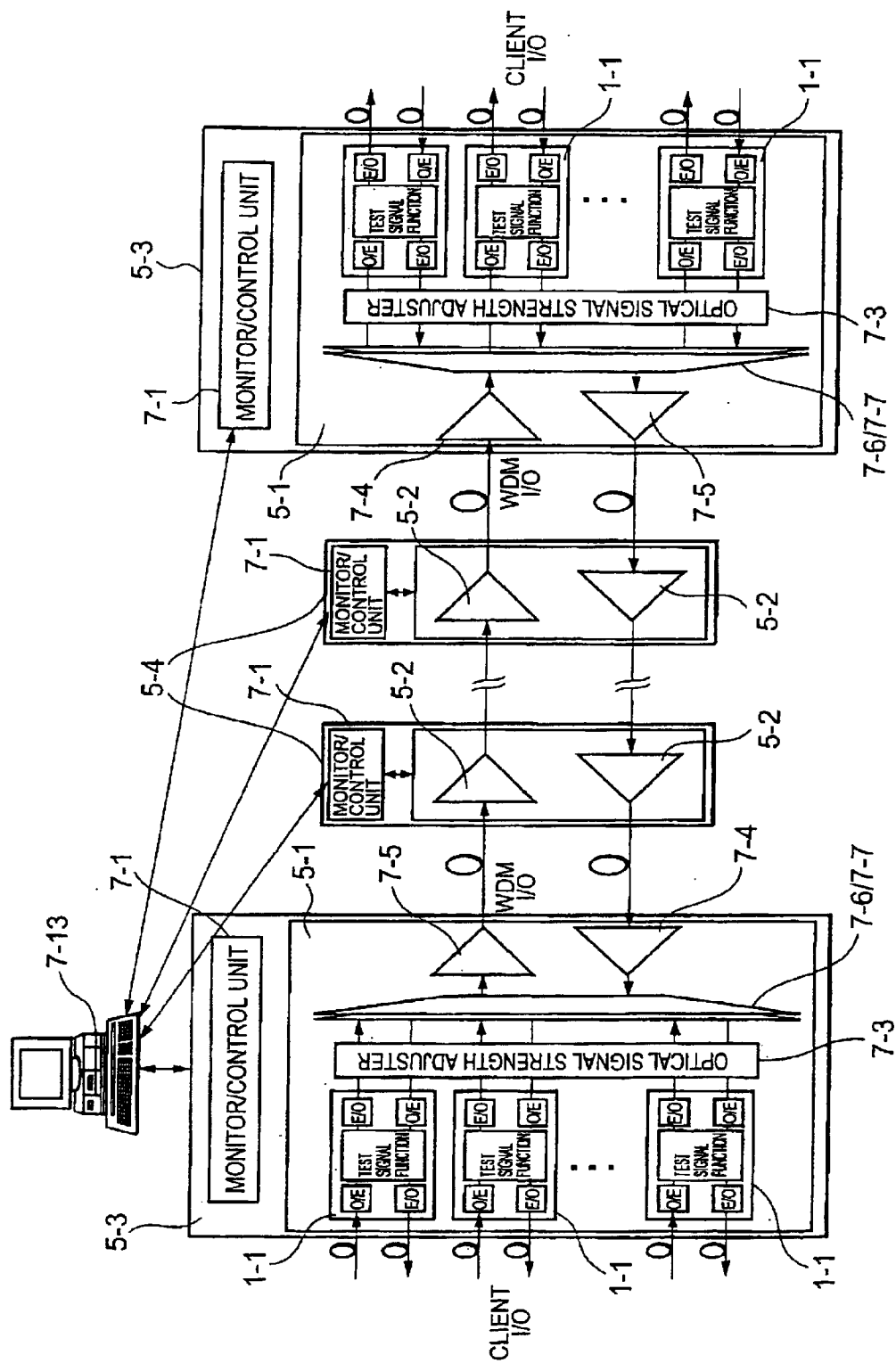
FIG. 8 shows a fifth preferred embodiment of the optical network system according to the present invention.

FIG. 8 shows a fifth preferred embodiment of the optical network system according to the present invention. In this preferred embodiment, the present invention is implemented in a point-to-point system with nodes that have signal test functions. In the basic configuration, wavelength-division multiplex relay nodes 5-4 are placed between wavelength-division multiplex terminal station nodes 5-3 for optical signal strength compensation. Each wavelength-division multiplex terminal station node 5-3 has a wavelength-division multiplex terminal station node division-division multiplex unit 5-1, which includes multiple transponders 1-1 as shown in FIG. 1 with a signal test function. In these multiplex units 5-1, the optical signal level for each optical channel is adjusted by an optical signal strength adjuster 7-3, which is provided in each optical channel as shown as one unit in FIG. 8. The optical signals of the individual channels are multiplexed by a wavelength-division multiplex unit 7-7 and are amplified by a post-amplifier 7-5 to boost the optical signal level to the required level for transmission.

The optical signal level of the wavelength-division multiplexed optical signal is attenuated by the optical fiber transmission path is compensated by a linear wavelength-division multiplex relay optical amplifier 5-2 of a wavelength-division multiplex relay node 5-4, and is emitted into the next span of the optical path. At the receive-end wavelength-division multiplex terminal station node 5-3, the weakened optical signal is again compensated by an optical pre-amplifier 7-4 and is fed to a wavelength-division demultiplexer 7-6, where it is divided into its constituent wavelength channel signals and is input to a transponder 1-1. After optical paths are established for transmission of client signals, when it is required that a digital signal test of the path is first performed using the signal test functions at the transmit-end and receive-end nodes in order to assess the transmission quality of the path. If the quality of the first selected transmission path is lacking, another optical path is tested to select a necessary path that provides the client with good quality optical communication service. By using the optical network system operations system 7-13 to remotely control test settings and signal test results, etc. through the monitor/control unit 7-1 at each node, the transmission quality status of unused optical channels is always kept current.

For wavelength-division multiplex optical network systems capable of providing transparent communication service for a wide variety of client signal types, it has always been difficult to provide adequate capability for assessing transmission quality. For such systems, the present invention provides a means of improving the quality of service provided for client signals, by assuring high-quality digital signal transmission. The means is economical, and does not require major changes in equipment configuration.

What is claimed is:

1. An optical network system with quality control function in the optical network system wherein a signal to be transmitted is converted to an optical signal of a prescribed wavelength and transmitted over an optical transmission path by a transmit-end wavelength convener; and said optical signal from said optical transmission path is received and wavelength-converted by a receive-end wavelength converter, for regenerating the signal to be transmitted, the optical network system comprising:

said transmit-end wavelength converter for a transmit end with a first transponder further comprising:
an optical signal input unit for inputting an optical signal to be transmitted;
a test signal generator circuit ultimately connected to said optical signal input unit for generating a test signal for testing optical transmission quality, said test signal generator circuit further comprising:
a clock generator for generating a clock signal indicative of a bit rate to be added to the test signal;
an 'all 1s and all 0s' generator circuit for generating 'all 1s and all 0s' signals; and
a scrambler circuit connected to said 'all 1s and all 0s' generator circuit for scrambling the 'all 1s and all 0s' signals to generate a scrambled test signal;
an insertion circuit connected to said optical signal input unit and said test signal generator circuit for outputting an output signal by selectively inserting the test signal from said test signal generator circuit into the transmission path formed between the transmit end and a receive end; and
a converter connected to said insertion circuit for converting the output signal of said insertion circuit to a predetermined optical wavelength; and
said receive-end wavelength converter at the receive end with a second transponder further comprising:
an extraction circuit for selectively extracting the test signal in the optical signal from said transmission path;
a test comparison circuit connected to said extraction circuit for determining the optical transmission quality based on the test signal extracted by said extraction circuit, said test comparison circuit further comprising:
a clock extraction circuit for extracting the clock signal from the test signal that is received at the receive end in order to synchronize with the bit rate of the selected test signal;

a descrambler circuit connected to said clock extraction circuit for using the clock component for descrambling the scrambled test signal to generate descrambled signals;

a selector circuit connected to said descrambler unit for selecting one of the descrambled signals from said descrambler circuit; and a comparison test circuit connected to said selector circuit for performing a test signal comparison and a bit error count/computation of the selected descrambled signal.

2. The optical network system with quality control function according to claim 1 wherein said test signal generator circuit further comprises a pseudo-random signal generator circuit.

3. The optical network system with quality control function according to claim 1 further comprising:

a switch for initiating the test signal comparison for assessing the quality of the transmission path prior to transmitting the signal to be transmitted; and if the quality of the transmission path is less than a predetermined transmission path quality level, another transmission path is established, and another test signal comparison being performed for the quality of said another transmission path.

4. An optical transponder in connection with a client line and an optical transmission line, comprising:

a first optical to electronic (O/E) converter for converting an optical signal from the client line to an electronic signal;

a signal testing unit connected to said first O/E converter for selectively adding a scrambled test signal to the electronic signal so as to generate a test-signal-contained electronic signal, said signal testing unit further comprising:

a clock generator for generating a clock signal indicative of a bit rate of a scrambled test signal to be added to the electronic signal;

an 'all 1s and all 0s' generator circuit for generating 'all 1s and all 0s' signals; and a scrambler circuit connected to said 'all 1s and all 0s' generator circuit for scrambling the 'all 1s and all 0s' signals to generate the scrambled test signal a first electronic to optical (E/O) converter connected to said signal testing unit for converting the test-signal-contained electronic signal to generate a test-signal-contained optical signal to be transmitted in the optical transmission line;

a second optical to electronic (O/E) converter connected to said signal testing unit for converting a received test-signal-contained optical signal from the optical transmission line to a second test-signal-contained electronic signal, wherein said signal testing unit determines the quality of transmission in the optical transmission line based upon the second test-signal-contained electronic signal, said signal testing unit further comprising:

a clock extraction circuit for extracting the clock signal from the second test signal contained electronic signal in order to synchronize with the bit rate of the electronic test signal;

a descrambler circuit connected to said clock extraction circuit for using a clock signal component for descrambling a scrambled test signal component of the second test-signal-contained electronic signal to generate descrambled signals;

a selector circuit connected to said descrambler unit for selecting one of the descrambled signals from said descrambler circuit;

a comparison test circuit connected to said selector circuit for performing a test signal comparison and a bit error count/computation of the selected descrambled signal; and a second electronic to optical (E/O) converter connected to said signal testing unit for converting the second test-signal-contained electronic signal to generate received optical signal for the client line.

5. The optical transponder according to claim 4 wherein said signal testing unit further includes a random signal generation unit for generating a random signal as the scrambled test signal.

6. The optical transponder according to claim 4 wherein said signal testing unit further includes a predetermined signal generation unit for generating a predetermined sequence of 0 and 1 signals.

7. The optical transponder according to claim 4 wherein said signal testing unit further includes an error count unit for counting a number of errors or bit errors based upon the second test-signal-contained electronic test signal.

8. The optical transponder according to claim 4 wherein said first O/E converter and said second O/E converter each convert from a predetermined single wavelength, and wherein said first E/O converter and said second E/O converter each convert to a predetermined single wavelength.

9. The optical transponder according to claim 4 wherein said first O/E converter converts from a predetermined wavelength optical signal to an electronic signal and said second O/E converter converts from an optical signal with a variable wavelength to an electronic signal, and wherein said first E/O converter converts from an electronic signal to an optical signal with a variable wavelength and said second E/O converter converts from an electronic signal to a predetermined wavelength optical signal.

10. An optical signal network in connection with client lines and an optical network transmission line, a plurality of nodes each connected to a corresponding one of the client lines and the optical network transmission line, the client lines each having an optical signal at a predetermined optical wavelength, the optical network transmission line having an optical signal comprising multiplexed wavelengths, each of said nodes comprising:

an optical wavelength separator connected to the optical network transmission line for separating a desired wavelength from the optical signal comprising multiplexed wavelengths;

an optical wavelength combiner connected to the client lines and the optical network transmission line for creating the optical signal comprising multiplexed wavelengths; and a transponder connected to said optical wavelength separator and said optical wavelength combiner for converting an optical signal at a first wavelength to a second wavelength, said transponder further comprising a set of optical-to-electronic converters, electronic-to-optical converters and a transmission quality testing unit connected between an optical-to-electronic converter and an electronic-to-optical converter for testing a transmission quality of the optical network transmission line, said transmission quality testing unit further comprising;

a test signal generator circuit for generating a test signal for testing optical network transmission line quality, said test signal generator circuit further comprising:

a clock generator connected to said test signal generator circuit for generating a clock signal indicative of a bit rate of the test signal from said test signal generator circuit;

an 'all 1s and all 0s' generator circuit for generating 'all 1s and 0s' signals;

a scrambler circuit connected to said 'all 1s and all 0s' generator circuit for scrambling the 'all 1s and all 0s' signals to generate a scrambled test signal;

a test comparison circuit for determining the optical network transmission line quality based on a test signal received from other nodes, said test comparison circuit further comprising:

a clock extraction circuit for extracting a clock signal from a separated wavelength signal in order to determine the bit rate of the separated wave length signal, a descrambler circuit connected to said clock extraction circuit for using the clock signal for descrambling a received scrambled test signal to generate descrambled signals;

a selector circuit connected to said descrambler unit for selecting one of a test signal comparison and a bit error count/computation of a selected descrambled signal.

11. The optical signal network according to claim 10 wherein said optical wavelength separator is an optical demultiplexer.

12. The optical signal network according to claim 10 wherein said optical wavelength combiner is an optical multiplexer.

13. The optical signal network according to claim 10 further comprising an optical switch matrix located between said optical wavelength separator and said optical wavelength combiner.

14. The optical signal network according to claim 10 further comprising a monitor control unit connected to said transmission quality testing unit for monitoring and controlling said transmission quality testing unit.

15. The optical signal network according to claim 10 wherein said optical wavelength separator is an optical wavelength add/drop module.

16. The optical signal network according to claim 10 wherein said optical wavelength combiner is an optical wavelength add/drop module.

17. The optical signal network according to claim 10 wherein a plurality of said transponders each receive a predetermined optical wavelength signal from said optical wavelength separator for any combination of desired wavelengths.

18. The optical signal network according to claim 10 wherein a plurality of said transponders receives optical signals from the client lines in any combination of desired wavelengths to output to said optical wavelength combiner.

19. A method of testing transmission quality in an optical network having optical transmission lines and client lines connected to the optical transmission lines, comprising:

converting an optical signal at a first wavelength from one of the client lines to an electrical signal in a transponder;

generating a test signal for testing optical transmission line quality;

specifying a bit rate of the test signal by adding a clock signal to a test signal generator;

adding the electrical signal and the test signal in the transponder to create a sum signal;

scrambling the sum signal to generate a scrambled test signal;

converting the scrambled test signal to an optical signal at a second wavelength in the transponder to be transmitted in the optical transmission lines;

converting an optical signal at the second wavelength from the optical transmission lines to a second electrical signal in the transponder;

extracting a clock signal from the second electrical signal;

descrambling the second electrical signal based upon the extracted clock signal to generate descrambled signals;

selecting one of the descrambled signals;

performing a test signal comparison and a bit error count/computation with the selected descrambled signal;

synchronizing the bit rate of the test signal with the clock signal;

determining transmission quality based upon the test signal comparison in the transponder; and converting the second electrical signal to an optical signal at the first wavelength in the transponder to be outputted to the one of the client lines.

20. The method of testing transmission quality in an optical network according to claim 19 further comprising selecting the client lines based on the transmission quality.

21. The method of testing transmission quality in an optical network according to claim 19 further comprising selecting the optical transmission lines based upon the transmission quality.

22. The method of testing transmission quality in an optical network according to claim 19 further comprising multiplexing a plurality of wavelengths to form an optical signal for a transmission line, wherein said transmission quality is determined for each of the wavelengths of the optical signal.

23. The method of testing transmission quality in an optical network according to claim 19 further comprising demultiplexing an optical signal received from the optical transmission lines into a plurality of wavelengths including the first wavelength; and selecting at least a part of the plurality of wavelengths that includes the first wavelength in order to determine transmission quality.

24. The method of testing transmission quality in an optical network according to claim 23 wherein the selected part of the plurality of wavelengths of the demultiplexed optical signal is remotely selected for determining the transmission quality.

* * * * *